United States Patent
Lin et al.

(10) Patent No.: US 10,077,545 B2
(45) Date of Patent: Sep. 18, 2018

(54) DUAL-ADJUSTMENT FLOW LIMITING DEVICE

(71) Applicants: Xiaofa Lin, Nan'an (CN); Xiaoshan Lin, Nan'an (CN); Qiqiao Liu, Nan'an (CN); Xiaoqing Deng, Nan'an (CN); Qun Yu, Nan'an (CN)

(72) Inventors: Xiaofa Lin, Nan'an (CN); Xiaoshan Lin, Nan'an (CN); Qiqiao Liu, Nan'an (CN); Xiaoqing Deng, Nan'an (CN); Qun Yu, Nan'an (CN)

(73) Assignee: Fujian Xihe Sanitary Ware Technology Co., Ltd., Nan'an (CN)

( * ) Notice: Subject to any disclaimer, the term of this patent is extended or adjusted under 35 U.S.C. 154(b) by 0 days.

(21) Appl. No.: 15/486,267

(22) Filed: Apr. 12, 2017

(65) Prior Publication Data

US 2017/0218609 A1 Aug. 3, 2017

(51) Int. Cl.
*E03C 1/02* (2006.01)
*E03C 1/08* (2006.01)
*G05D 7/01* (2006.01)

(52) U.S. Cl.
CPC ............... *E03C 1/08* (2013.01); *G05D 7/012* (2013.01); *E03C 2001/026* (2013.01); *H05K 999/99* (2013.01)

(58) Field of Classification Search
USPC ........................................................ 138/46
See application file for complete search history.

(56) References Cited

U.S. PATENT DOCUMENTS

| | | | | |
|---|---|---|---|---|
| 1,921,827 A * | 8/1933 | Kersten | ............... | F16K 1/526 138/46 |
| 2,878,836 A * | 3/1959 | Binks | ............... | F16K 17/34 137/512.15 |
| 2,948,296 A * | 8/1960 | Thorburn | ............... | F16K 17/34 137/517 |
| 4,000,857 A * | 1/1977 | Moen | ............... | B05B 1/3006 137/860 |
| 4,457,343 A * | 7/1984 | Zukausky | ............... | G05D 7/012 138/45 |
| 5,769,326 A * | 6/1998 | Muchenberger | ......... | E03C 1/08 239/428.5 |
| 6,695,011 B2 * | 2/2004 | Sochtig | ............... | G05D 7/012 137/516.15 |
| 7,217,362 B2 * | 5/2007 | Hsiao | ............... | B01D 35/04 137/801 |

(Continued)

*Primary Examiner* — John Fox (57) ABSTRACT

A dual-adjustment flow limiting device includes an outer shell, an inner shell, a flow limiting member, and an adjustment mechanism. The outer shell defines a plurality of external ports. The inner shell defines a flow chamber and a plurality of internal ports communicating with the flow chamber and is fitted into the outer shell such that a communicating area is formed between the internal and external ports. The flow limiting member is disposed in the flow chamber of the inner shell and can be deformed in response to the pressure of a water flow entering the flow chamber to partially block the internal ports, so that the water flow entering the flow chamber can be restricted. The adjustment mechanism is provided at the outer and inner shells to adjust the communicating area, so that the water flow can be further restricted.

8 Claims, 7 Drawing Sheets

(56) References Cited

U.S. PATENT DOCUMENTS

| | | | |
|---|---|---|---|
| 8,402,995 B2* | 3/2013 | Zoller | G05D 7/012 |
| | | | 137/454.2 |
| 9,901,940 B2* | 2/2018 | Gong | B05B 1/06 |
| 2014/0110005 A1* | 4/2014 | Ho | G05D 7/012 |
| | | | 138/43 |
| 2016/0024769 A1* | 1/2016 | Zoller | E03C 1/084 |
| | | | 239/407 |
| 2018/0080204 A1* | 3/2018 | Norling | E03C 1/086 |

* cited by examiner

DUAL-ADJUSTMENT FLOW LIMITING DEVICE

(A) TECHNICAL FIELD OF THE INVENTION

The present invention relates to a flow limiting device and, more particularly, to a dual-adjustment flow limiting device to work with a water outlet device.

(B) DESCRIPTION OF THE PRIOR ART

Currently, water outlet devices used in households are usually required to be installed with a flow limiting device to prevent excessive water pressure which may cause damages to the users or other components upon opening the water outlet devices. Also, the flow limiting device can reduce waste of water resources. Conventional flow limiting devices generally employ a flow limiting component therein to restrict a water flow; however, they can only be employed to reduce a specified amount of water flow and cannot offer users more than one configuration for flow reduction so as to facilitate an application. Besides, the flow limiting component used in the conventional flow limiting devices is prone to be damaged, or easy to escape out of the device for lacking anti-off ribs, thus reducing the service life of the device or suffering loss of the intended function of the device.

SUMMARY OF THE INVENTION

One object of the present invention is to provide a dual-adjustment flow limiting device that is simple in structure, reasonable in design, and can be implemented easily to solve the disadvantages of conventional devices. In addition to the flow limiting member capable of restricting a water flow, a user may adjust a water flow which flows through the device via an adjustment mechanism according to users' demands, thus increasing the flexibility and applicability of the device.; furthermore, a flow limiting member disposed circumferentially and radially in the device can be deformed evenly, so that the water flow can be restricted evenly.

To achieve the above object, the present invention provides a dual-adjustment flow limiting device, which comprises an outer shell defining a plurality of external ports; an inner shell defining a flow chamber and a plurality of internal ports communicating with the flow chamber, and fitted into the outer shell; a flow limiting member disposed in the flow chamber of the inner shell, capable of being deformed in response to the pressure of a flow entering the flow chamber of the inner shell to partially block the internal ports, so that the flow entering the flow chamber of the inner shell can be restricted; and an adjustment mechanism provided at the outer and inner shells for adjusting the communicating area between the internal and external ports, so that the flow entering the flow chamber of the inner shell can be further restricted.

Preferably, the adjustment mechanism includes an engagement protrusion provided at the inner shell, and at least two engagement grooves provided at the outer shell and spaced at a predetermined angle therebetween, the engagement protrusion capable of being positioned to either of the two engagement grooves, whereby the communicating area between the internal and external ports can be adjusted, and thus the flow entering the flow chamber can be adjusted.

Preferably, the flow chamber is provided at its inner circumferential surface with a plurality of limitation ridges protruding towards a central line of the flow chamber, and the flow limiting member is a ring-shaped member disposed to abut on the limitation ridges of the inner shell.

Preferably, each of the limitation ridges is polygonal, semicircular, or oval in cross section.

Preferably, the internal ports of the inner shell completely coincide with the external ports of the outer shell to result in a larger communicating area when the engagement protrusion of the inner shell is positioned to one of the engagement grooves of the outer shell; on the other hand, the internal ports of the inner shell partially coincide with the external ports of the outer shell to result in a smaller communicating area when the engagement protrusion of the inner shell is positioned to the other of the engagement grooves of the outer shell.

Preferably, the inner shell is provided in the flow chamber with a plurality of spaced anti-off ribs extending upwardly from a bottom of the inner shell and curving outwardly at their free ends.

Preferably, the outer or inner shell is provided at its outer circumferential surface with a connection portion to be connected to an external component.

Alternatively, a dual-adjustment flow limiting device comprises: an outer shell defining a plurality of external ports which are classified into two groups each containing at least one external port; an inner shell defining a flow chamber and a plurality of internal ports communicating with the flow chamber, and fitted into the outer shell such that-the internal ports are spaced from the external ports by the flow chamber, the flow chamber being provided at its inner circumferential surface with a plurality of limitation ridges protruding towards a central line of the flow chamber and extending beyond a top of the inner shell; an adjustment mechanism provided at the outer and inner shells for selectively aligning the limitation ridges with one group of external ports, so that a water flow can be restricted; and a flow limiting member disposed in the flow chamber of the inner shell, capable of being deformed in response to the pressure of the flow entering the flow chamber of the inner shell to partially block the internal ports, so that the flow entering the flow chamber of the inner shell can be further restricted.

The present invention has the following advantages:

(1) The dual-adjustment flow limiting device of the present invention is simple in structure, reasonable in design, and can be implemented easily to solve the disadvantages of conventional devices. In addition to the flow limiting member capable of restricting a water flow, a user may adjust a water flow which flows through the device via an adjustment mechanism according to users' demands, thus increasing the flexibility and applicability of the device; furthermore, a flow limiting member disposed circumferentially and radically in the device can be deformed evenly, so that the water flow can be restricted evenly.

(2) The flow limiting device can provide an effective and reliable flow reduction and allows a user to easily change the flow reduction through the adjustment mechanism, and its structure would not become loose after changing the flow reduction.

(3) The limitation ridges can prevent the flow limiting member from excessive deformation which may lead to a total blockage of the water flow and a reduction of the service life of the device.

(4) The limitation ridges can be offered with various shapes in cross section to obtain different results of the flow restriction.

(5) In one embodiment of the present invention, the outer shell is located under the inner shell, wherein the water flow is first restricted by the flow limiting member and then can be further restricted by the interaction between the inner shell and the outer shell via an adjustment mechanism. This embodiment has advantages of fewer components and easy assembly. In this embodiment, the anti-off ribs provided at the inner shell can prevent the flow limiting member from slipping off.

(6) In another embodiment, the outer shell is located on the inner shell, wherein the water flow can be restricted by using the limitation ridges to close some of the external ports, and then the water flow can be further restricted by the flow limiting member. This embodiment has advantages of fewer components and easy assembly as well.

Other objects, advantages, and novel features of the present invention will become more apparent from the following detailed description when taken in conjunction with the accompanying drawings.

BRIEF DESCRIPTION OF THE DRAWINGS

The accompanying drawings and the associated embodiments are used for illustrating the present invention more clearly, but not for limiting the scope of the present invention, wherein.

DETAILED DESCRIPTION OF THE PREFERRED EMBODIMENTS

To illustrate technical problems, a solution for the problems, and the advantages of the solution more clearly, exemplary embodiments are provided in the following paragraphs in conjunction with the accompanying drawings. It should be understood that those embodiments are used for illustrating the present invention, but not for limiting the scope of the present invention.

Figure 1:
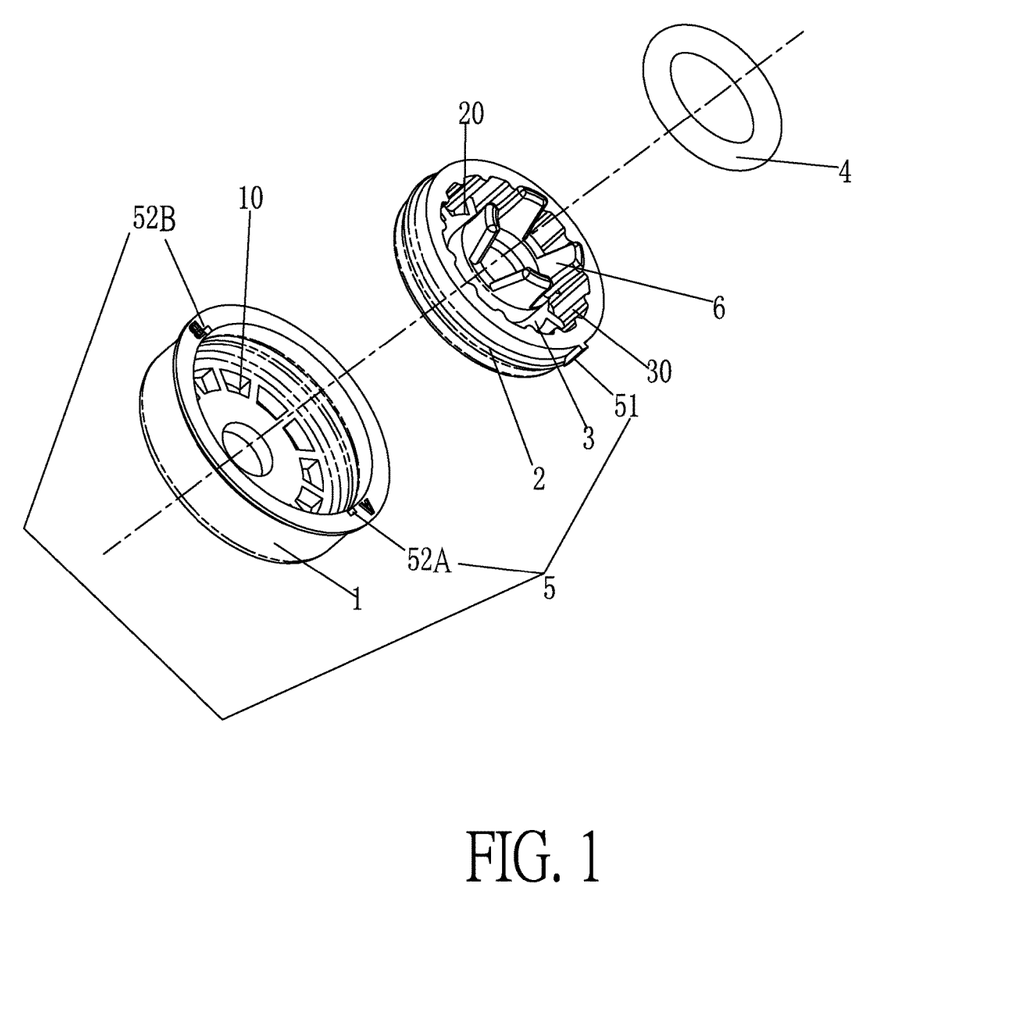
FIG. 1 shows an exploded view of a flow limiting device according to a first embodiment of the present invention.
Figure 2:
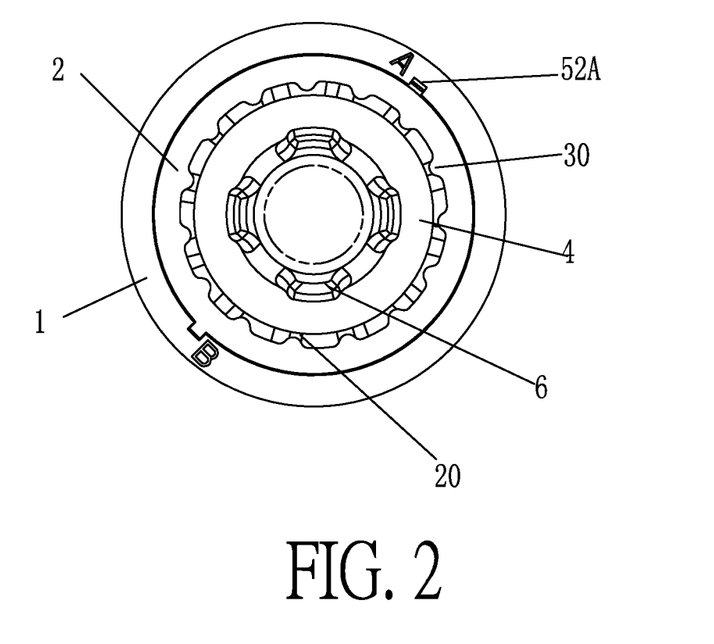
FIG. 2 shows a top view of the flow limiting device of the first embodiment, wherein the engagement protrusion is positioned to the engagement groove (A)

Referring to FIG. 1, a dual-adjustment flow limiting device according to a first embodiment of the present invention is shown, which generally includes an outer shell 1 and an inner shell 2, wherein the outer shell 1 defines a plurality of external ports 10, which allows a water flow to flow through the outer shell 1. The inner shell 2 defines a flow chamber 3 and a plurality of internal ports 20 communicating with the flow chamber 3 for allowing a water flow to flow through the inner shell 2. The inner shell 2 is fitted into the outer shell 1, such that the internal ports 20 are adjacent to the external ports 10, and a communicating area is formed between the internal ports 20 and the external ports 10.

The flow chamber 3 is provided at its inner circumferential surface with a plurality of limitation ridges 30, which are arranged at intervals and protrude towards a central line of the flow chamber 3. The limitation ridges 30 each have a polygonal, semicircular, or oval cross-section.

Figure 3:
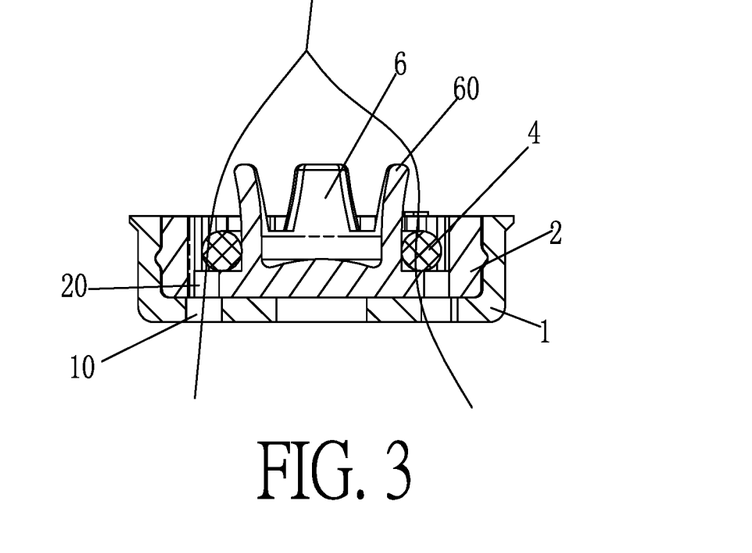
FIG. 3 shows a sectional view of the flow limiting device of the first embodiment, wherein the engagement protrusion is positioned to the engagement groove (A)
Figure 4:
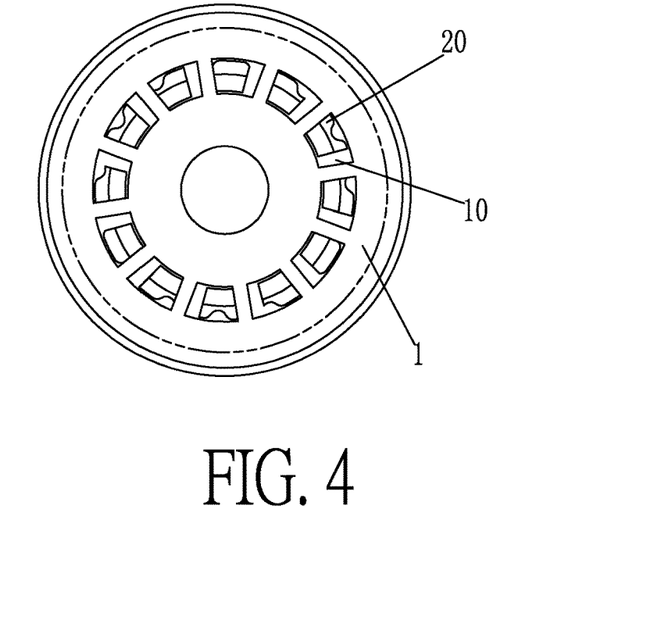
FIG. 4 shows a bottom view of the flow limiting device of the first embodiment, wherein the engagement protrusion is positioned to the engagement groove (A)
Figure 5:
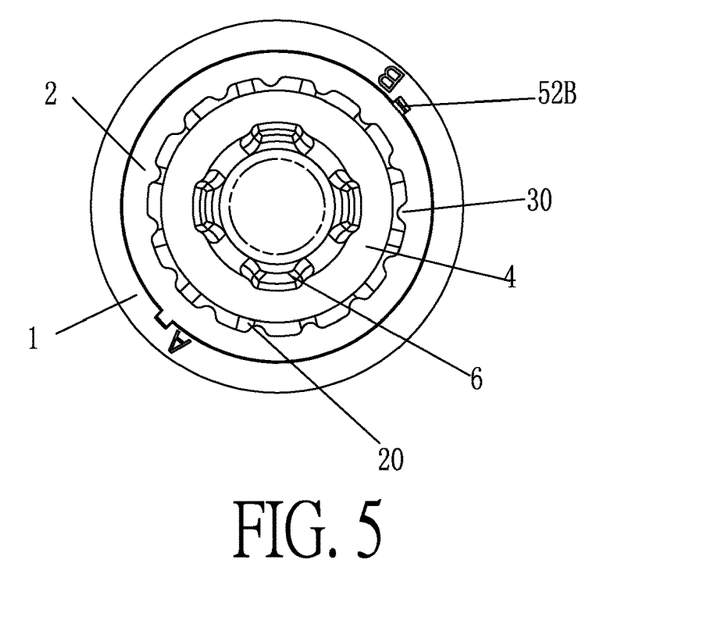
FIG. 5 shows a top view of the flow limiting device of the first embodiment, wherein the engagement protrusion is positioned to the engagement groove (B)
Figure 6:
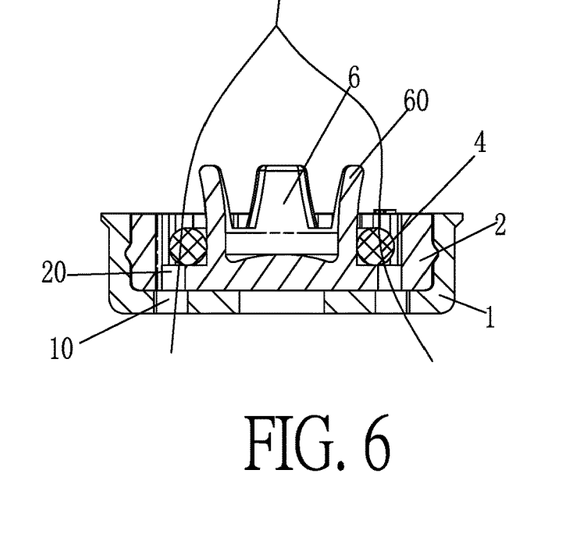
FIG. 6 shows a sectional view of the flow limiting device of the first embodiment, wherein the engagement protrusion is positioned to the engagement groove (B)
Figure 7:
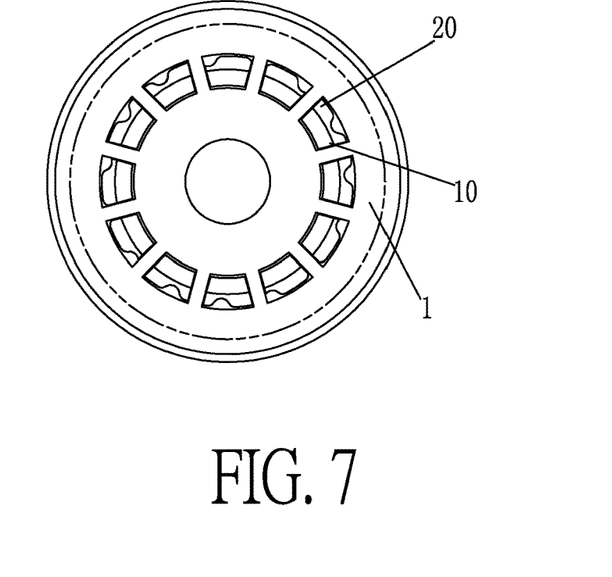
FIG. 7 shows a bottom view of the flow limiting device of the first embodiment, wherein the engagement protrusion is positioned to the engagement groove (B)

A flow limiting member 4 is disposed in the flow chamber 3 of the inner shell 2. The flow limiting member 4 is a ring-shaped member and disposed circumferentially to abut on the limitation ridges 30. The flow limiting member 4 can partially block the internal ports 20, so that the water flow entering the flow chamber 3 can be restricted. Furthermore, the inner shell 2 can be provided in the flow chamber 3 with a plurality of anti-off ribs 6 extending upwardly from a bottom of the inner shell 2 and curving outwardly at their free ends 60 (see FIG. 3).

An adjustment mechanism 5 is provided at the outer shell 1 and the inner shell 2 for adjusting the communicating area between the external ports 10 and the internal ports 20, so that the water flow entering the flow chamber 3 can be further restricted. Along with the restriction by the deformation of the flow limiting member 4, the flow limiting device thus involves two restriction processes for reducing a water flow.

More specifically, the adjustment mechanism 5 includes an engagement protrusion 51 and at least two engagement grooves 52A, 52B, wherein the engagement protrusion 51 is provided at the inner shell 2 while the engagement grooves 52A, 52B are provided at the outer shell 1. Alternatively, the engagement protrusion 51 may be provided at outer shell 1, while the engagement grooves 52A, 52B may be provided at the inner shell 2. The two engagement grooves 52A, 52B are spaced at a predetermined angle therebetween. The engagement protrusion 51 of the inner shell 2 can be positioned to either of the two engagement grooves 52A, 52B of the outer shell 1 to adjust the communicating area between the internal ports 20 and the external ports 10, so that the water flow entering the flow chamber 3 can be adjusted accordingly More specifically, the outer shell 1 or the inner shell 2 can be provided at its outer circumferential surface with a connection portion to be connected to an external component.

In assembling of the first embodiment, as shown in FIG. 1, the flow limiting member 4 is firstly fitted around the anti-off ribs 6. Due to the spaced anti-off ribs 6 containing a predetermined level of elasticity, the flow limiting member 4 can be easily put around the ribs. Due to the anti-off ribs 6 extending upwardly and curving outwardly at their free ends 60, the flow limiting member 4 is uneasy to escape from the ribs. Thereafter, the inner shell 2 can be fitted into the outer shell 1, wherein the outer shell 1 is generally located under the inner shell 2, and the external ports 10 of the outer shell 1 can coincide with the internal ports 20 of the inner shell 2 completely or partially.

In use, a user may change the position of the inner shell 2 relative to the outer shell 1 through the adjustment mechanism 5 according to users' demands (see FIGS. 2 through 7). The engagement protrusion 51 can be selectively positioned to one of the two engagement grooves 52A, 52B. When the engagement protrusion 51 is positioned to the engagement groove 52A (see FIGS. 2 through 4), the internal ports 20 partially coincide with the external ports 10. A water flow entering the flow chamber 3 of the inner shell 2 can force the flow limiting member 4 to deform. The more the pressure of the water flow is, the more the flow limiting member 4 deforms. The deformation of the flow limiting member 4 would partially block the internal ports 20, thus the water flow can be restricted (i.e. first flow restriction). Even though the flow limiting member 4 is under maximum deformation, due to the limitation ridges 30, the water flow can still flow through the internal ports 20. In addition, the partial coincidence between the internal ports 20 and the external ports 10 would result in a reduced communicating area, so that the water flow can be further restricted (i.e. second flow restriction). When the engagement protrusion 51 is positioned to the engagement protrusion 52B (see FIGS. 5 through 7), the internal ports 20 completely coincide with the external ports 10, so that the water flow is not further restricted. A user may choose one of the above two configurations of the adjustment mechanism according to users' demands.

FIGS. 8 through 12 show a second embodiment of the present invention, which generally includes an outer shell 1B defining a plurality of external ports that are classified into two groups (first group and second group), an inner shell 2B defining a plurality of internal ports 20 and a flow chamber 3 communicating with the internal ports 20, and a flow limiting member 4B, wherein the first group of external ports includes at least one external port 100 and the second group of external ports includes at least one external port 101.

Figure 8:
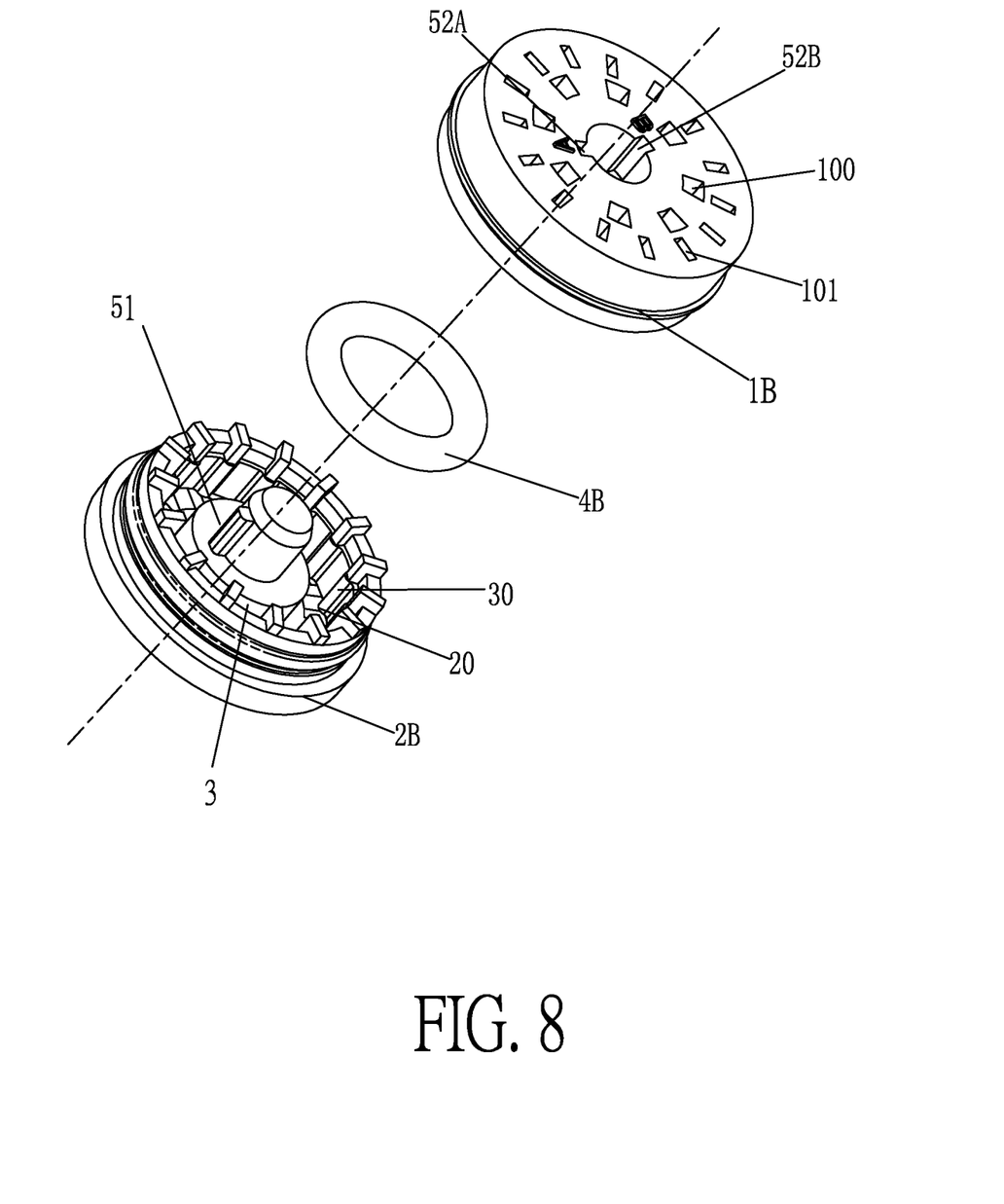
FIG. 8 shows an exploded view of a flow limiting device according to a second embodiment of the present invention.
Figure 9:
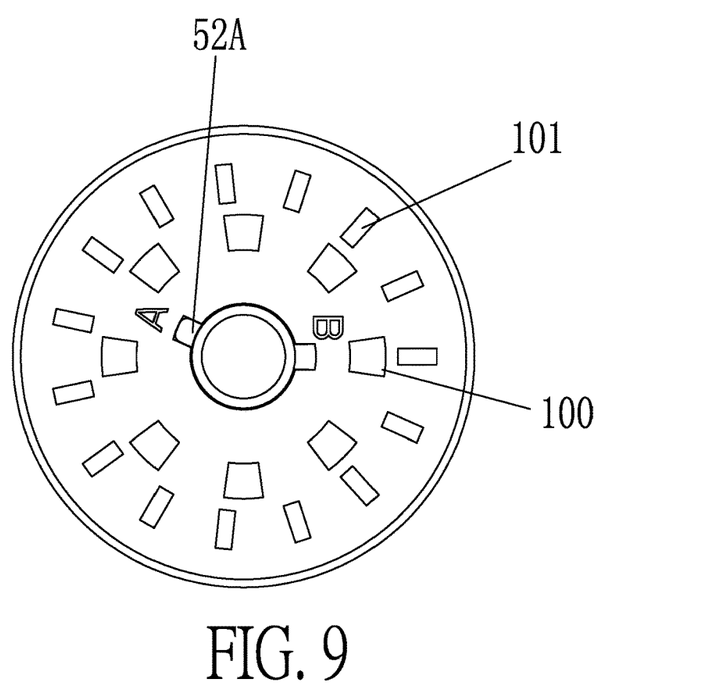
FIG. 9 shows a top view of the flow limiting device of the second embodiment, wherein the engagement protrusion is positioned to the engagement groove (A)
Figure 10:
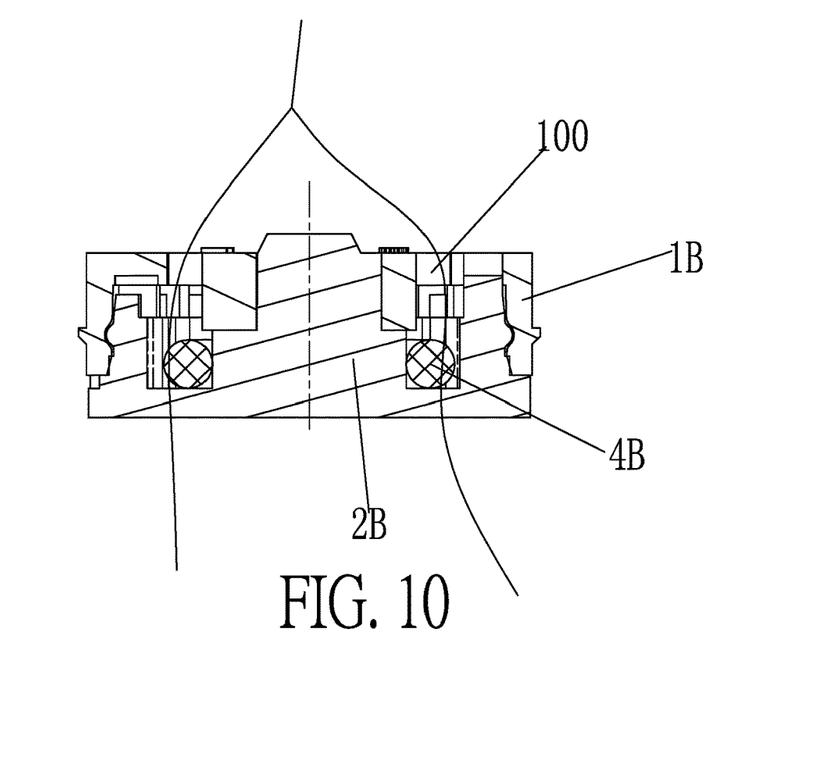
FIG. 10 shows a sectional view of the flow limiting device of the second embodiment, wherein the engagement protrusion is positioned to the engagement groove (A)
Figure 11:
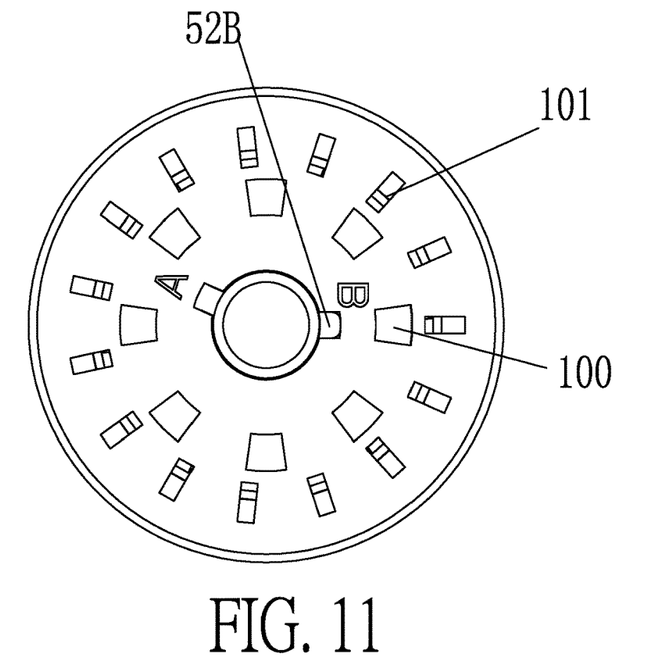
FIG. 11 shows a top view of the flow limiting device of the second embodiment, wherein the engagement protrusion is positioned to the engagement groove (B)
Figure 12:
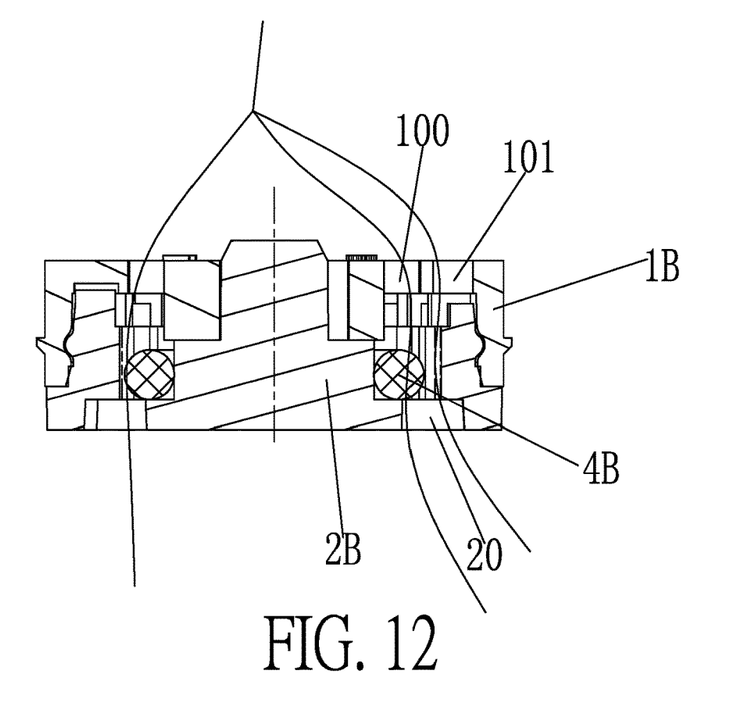
FIG. 12 shows a sectional view of the flow limiting device of the second embodiment, wherein the engagement protrusion is positioned to the engagement groove (B).

In assembling of the second embodiment, as shown in FIG. 8, the flow limiting member 4B is firstly placed within the inner shell 2B, and then the inner shell 2B is fitted into the outer shell 1B, wherein the outer shell 1B is generally located on the inner shell 2B, and the external ports 100, 101 are spaced from the internal ports 20 by the flow chamber 3. The limitation ridges 30 provided at the inner shell 2B extend beyond the top of the inner shell 2 to cooperate with one of the two groups of external ports 100, 101. In this embodiment, the limitation ridges 30 are designed to cooperate with the second group of external ports 101, wherein the limitation ridges 30 can be aligned with the external ports 101 so that the external ports 101 can be closed (see FIG. 10), or alternatively, the limitation ridges 30 can be out of alignment of the external ports 101 so that the external ports 101 can be opened (see FIG. 12). In this embodiment, the water flow can be adjusted by the relative position between the limitation ridges 30 and the external ports 101.

In use, a user may change the position of the inner shell 2B relative to the outer shell 1B through the adjustment mechanism 5 (see FIGS. 8 through 12). The engagement protrusion 51 can be selectively positioned to either of the two engagement grooves 52A, 52B. When the engagement protrusion 51 is positioned to the engagement groove 52A (see FIGS. 9 and 10), the second group of external ports 101 can be blocked by the top ends of the limitation ridges 30, causing a water flow to be restricted. Under this circumstance, only the first group of external ports 100 allows the water flow to enter the flow chamber 3 (see FIG. 10). Thereafter, the water flow entering the flow chamber 3 would cause the flow limiting member 4B to deform. The more the pressure of the water flow is, the more the flow limiting member 4B deforms. The deformation of the flow limiting member 4B would cause the internal ports 20 to be partially blocked, so that the water flow can be further restricted. Even though the flow limiting member 4B is under maximum deformation, the water flow can still flow through the internal ports 20 because of the limitation ridges 30. The engagement protrusion 51 being positioned to the engagement groove 52A is one configuration of the adjustment mechanism 5. On the other hand, when the engagement protrusion 51 is positioned to the engagement groove 52B (see FIGS. 11 and 12), both groups of external ports 100, 101 are not blocked by the top ends of the limitation ridges 30, and thus a water flow can flow into the flow chamber 3 via both groups of external ports 100. 101. Thereafter, the water flow entering the flow chamber 3 can be restricted by the deformation of flow limiting member 4B. The engagement protrusion 51 being positioned to the engagement groove 52B is another configuration of the adjustment mechanism 5. A user may choose one of the above two configurations of the adjustment mechanism 5 according to users' demands.

As a summary, the dual-adjustment flow limiting device of the present invention is simple in structure, reasonable in design, and can be implemented easily. In addition to the flow limiting member capable of restricting a water flow, a user may adjust a water flow which flows through the device via an adjustment mechanism according to users' demands, thus increasing the flexibility and applicability of the device. Furthermore, since the flow limiting member circumferentially and radically disposed in the device can be deformed evenly, the water flow can be restricted evenly; the flow limiting device can provide an effective and reliable flow reduction and allows a user to easily change the flow reduction through the adjustment mechanism, and its structure would not become loose after changing the flow reduction; the limitation ridges can prevent the flow limiting member from excessive deformation which may lead to a total blockage of the water flow and a reduction of the service life of the device; the limitation ridges can be offered with various shapes in cross section to obtain different results of the flow restriction; in one embodiment of the present invention, the outer shell is located under the inner shell, wherein the water flow is first restricted by the flow limiting member and then can be further restricted by the interaction between the inner shell and the outer shell via an adjustment mechanism. This embodiment has advantages of fewer components and easy assembly. In this embodiment, the anti-off ribs provided at the inner shell can prevent the flow limiting member from slipping off, in another embodiment, the outer shell is located on the inner shell, wherein the water flow can be restricted by using the limitation ridges to close some of the external ports, and then the water flow can be further restricted by the flow limiting member. This embodiment has advantages of fewer components and easy assembly as well.

Although the present invention has been described with a certain degree of particularity, it is understood that the present disclosure is made by way of example only and the combination and arrangement of parts may be resorted to without departing from the spirit and scope of the invention hereinafter claimed.

What is claimed is:

1. A dual-adjustment flow limiting device, comprising:
   an outer shell (1) defining a plurality of external ports (10);
   an inner shell (2) defining a flow chamber (3) and a plurality of internal ports (20) communicating with the flow chamber (3), and fitted into the outer shell (1);
   a flow limiting member (4) disposed in the flow chamber (3) of the inner shell (2), capable of being deformed in response to the pressure of a flow entering the flow chamber (3) of the inner shell (2) to partially block the internal ports (20), so that the flow entering the flow chamber (3) of the inner shell (2) can be restricted; and
   an adjustment mechanism (5) provided at the outer and inner shells (1), (2) for adjusting the communicating area between the internal and external ports (20), (10), so that the flow entering the flow chamber (3) of the inner shell (2) can be further restricted.

2. The dual-adjustment flow limiting device of claim 1, wherein the adjustment mechanism (5) includes an engagement protrusion (51) provided at the inner shell (2), and at least two engagement grooves (52A), (52B) provided at the outer shell (1) and spaced at a predetermined angle therebetween, the engagement protrusion (51) capable of being positioned to either of the two engagement grooves (52A), (52B), whereby the communicating area between the internal and external ports (20), (10) can be adjusted, and thus the flow entering the flow chamber (3) can be adjusted.

3. The dual-adjustment flow limiting device of claim 2, wherein the flow chamber (3) is provided at its inner circumferential surface with a plurality of limitation ridges (30) protruding towards a central line of the flow chamber (3), and the flow limiting member (4) is a ring-shaped member disposed to abut on the limitation ridges (30) of the inner shell (2).

4. The dual-adjustment flow limiting device of claim 3, wherein each of the limitation ridges (30) is polygonal, semicircular, or oval in cross section.

5. The dual-adjustment flow limiting device of claim 3, wherein the internal ports (20) of the inner shell (2) completely coincide with the external ports (10) of the outer shell (1) to result in a larger communicating area when the engagement protrusion (51) of the inner shell (1) is positioned to one of the engagement grooves (52A), (52B) of the outer shell (1); on the other hand, the internal ports (20) of the inner shell (2) partially coincide with the external ports (10) of the outer shell (1) to result in a smaller communicating area when the engagement protrusion (50) of the inner shell (1) is positioned to the other of the engagement grooves (52A), (52B) of the outer shell (1).

6. The dual-adjustment flow limiting device of claim 5, wherein the inner shell (2) is provided in the flow chamber (3) with a plurality of spaced anti-off ribs (6) extending upwardly from a bottom of the inner shell (2) and curving outwardly at their free ends (60).

7. The dual-adjustment flow limiting device of claim 1, wherein the outer or inner shell (1), (2) is provided at its outer circumferential surface with a connection portion to be connected to an external component.

8. A dual-adjustment flow limiting device, comprising:
   an outer shell (1B) defining a plurality of external ports (10) which are classified into two groups each containing at least one external port (100), (101);
   an inner shell (2B) defining a flow chamber (3) and a plurality of internal ports (20) communicating with the flow chamber (3), and fitted into the outer shell (1B) such that the internal ports (20) are spaced from the external ports (10) by the flow chamber (3), the flow chamber (3) being provided at its inner circumferential surface with a plurality of limitation ridges (30) protruding towards a central line of the flow chamber (3) and extending beyond a top of the inner shell (2B);
   an adjustment mechanism (5) provided at the outer and inner shells (1B), (2B) for selectively aligning the limitation ridges (30) with one group of external ports (101), so that a water flow to enter the flow chamber (3) can be restricted; and
   a flow limiting member (4) disposed in the flow chamber (3) of the inner shell (2B), capable of being deformed in response to the pressure of the flow entering the flow chamber (3) of the inner shell (2B) to partially block the internal ports (20), so that the flow entering the flow chamber (3) of the inner shell (2B) can be further restricted.

* * * * *

UNITED STATES PATENT AND TRADEMARK OFFICE
CERTIFICATE OF CORRECTION

PATENT NO. : 10,077,545 B2  
APPLICATION NO. : 15/486267  
DATED : September 18, 2018  
INVENTOR(S) : Xiaofa Lin et al.

Page 1 of 1

It is certified that error appears in the above-identified patent and that said Letters Patent is hereby corrected as shown below:

On the Title Page

Item [30], insert:
--April 21, 2016 (CN) ... 201620339800.0-- thereto.

Signed and Sealed this  
Fifth Day of February, 2019

Andrei Iancu  
*Director of the United States Patent and Trademark Office*